(12) United States Patent
Schneider

(10) Patent No.: US 8,758,661 B2
(45) Date of Patent: Jun. 24, 2014

(54) DEVICE FOR GENERATING A HOLLOW PLASTIC PROFILE

(75) Inventor: Florian Johannes Schneider, Bergen (DE)

(73) Assignee: Kraussmaffei Technologies GmbH, München (DE)

( * ) Notice: Subject to any disclaimer, the term of this patent is extended or adjusted under 35 U.S.C. 154(b) by 0 days.

(21) Appl. No.: 13/704,927

(22) PCT Filed: Jun. 20, 2011

(86) PCT No.: PCT/EP2011/060209
§ 371 (c)(1),
(2), (4) Date: Dec. 17, 2012

(87) PCT Pub. No.: WO2012/000817
PCT Pub. Date: Jan. 5, 2012

(65) Prior Publication Data
US 2013/0093127 A1    Apr. 18, 2013

(30) Foreign Application Priority Data
Jun. 29, 2010   (DE) .......................... 10 2010 025 524

(51) Int. Cl.
*B32B 1/08*   (2006.01)
(52) U.S. Cl.
USPC ........................................ 264/209.1; 425/144
(58) Field of Classification Search
USPC ........................................ 264/209.1; 425/144
See application file for complete search history.

(56) References Cited

U.S. PATENT DOCUMENTS

| 3,609,809 | A | * | 10/1971 | Slicker | 425/461 |
| 2010/0301526 | A1 | * | 12/2010 | Hackl | 264/563 |
| 2011/0158034 | A1 | | 6/2011 | Schneider | |
| 2012/0205831 | A1 | * | 8/2012 | Dohmann et al. | 264/40.6 |

FOREIGN PATENT DOCUMENTS

| DE | 102008047207 | 4/2010 |
| DE | 102008047210 | 4/2010 |
| DE | 102008047211 | 4/2010 |
| DE | 102009027437 | 1/2011 |
| JP | 2000-263629 | 9/2000 |
| WO | WO 2006/134228 | 12/2006 |
| WO | WO 2010/029143 | 3/2010 |
| WO | WO 2011000822 A1 * | 1/2011 |

* cited by examiner

*Primary Examiner* — Galen Hauth
(74) *Attorney, Agent, or Firm* — Henry M Feiereisen LLC

(57) ABSTRACT

A device for generating a hollow plastic profile, in particular a plastic tube, having an air guidance system for interior cooling of the tube, wherein said device allows for a more simple design, improved process properties, and better tube quality. The device according to the invention comprises an extrusion die (100) having a melt channel (114) encompassing the extrusion axis, an extruder that feeds plastic melt to the extrusion die (100), and a suction device for suctioning air through the interior of the profile opposite the direction of extrusion, wherein the extruder feeds the extrusion die (100) centrally and the suction device comprises a central suction tube (140) disposed within the melt channel and partial flow suction channels (144) connected to the central suction tube (140); in the suctioning direction and leading out of the interior of the extrusion die (100).

6 Claims, 3 Drawing Sheets

DEVICE FOR GENERATING A HOLLOW PLASTIC PROFILE

CROSS-REFERENCES TO RELATED APPLICATIONS

This application is the U.S. National Stage of International Application No. PCT/EP2011/060209, filed Jun. 20, 2011, which designated the United States and has been published as International Publication No. WO 2012/000817 and which claims the priority of German Patent Application, Serial No. 10 2010 025 524.6, filed Jun. 29, 2010, pursuant to 35 U.S.C. 119(a)-(d).

BACKGROUND OF THE INVENTION

The invention relates to a device for generating a hollow plastic profile, in particular a plastic tube, with an extrusion die with a melt channel encompassing the extrusion axle, an extruder feeding the extrusion die with plastic melt and a suction device for the suctioning of air through the interior of the profile contrary to the direction of extrusion, and a corresponding method.

Air guidance systems for tube interior cooling are known from the prior art, for example DE 10 2008 047 207 A1 or DE 10 2008 047 211 A1. Here, air is sucked through the interior of the tube contrary to the direction of extrusion, in order to thus cool the tube. In known systems, the suction of air through the profile is arranged centrally in front of the extrusion die, for example a tube head, and the extrusion die itself has an aperture in order to be able to suck the air through up to the end of the extrusion line, so that the feeding of melt must take place laterally. On the one hand, this has disadvantages related to manufacture, because the extrusion die must be provided with a corresponding aperture and the necessary lateral supplying of the melt leads to a more complex die construction. On the other hand, this also entails disadvantages related to method, because owing to the lateral supplying of melt, for example the loss of pressure increases and flushing times, e.g. on colour change, become longer, but also the homogeneous melt distribution over periphery of the tube is made difficult, which can, in addition lead to losses of quality.

SUMMARY OF THE INVENTION

It is therefore the object of the present invention to provide a device for generating a hollow plastic profile, in particular a plastic tube, with an air guidance system for interior cooling of the tube, which enables a simpler design, improved process properties and a better tube quality, and a corresponding method.

This problem is solved by an above-mentioned device for generating a hollow plastic profile, in particular a plastic tube, wherein the extruder feeds the extrusion die centrally, and the suction device comprises a central suction tube arranged within the melt channel, and partial flow suction channels which are connected to the central suction tube in the suctioning direction and lead out of the interior of the extrusion die, and a corresponding method.

The problem is based here on the idea of providing an extrusion die with a central melt feeding, in which therefore the extruder flange is arranged centrally in front of the extrusion die and feeds the melt from the front into the extrusion die, which at the same time has an air guidance system for interior cooling of the tube, which extends up to the end of the extrusion line, by the air flow being divided into partial flows which circumvent the extruder flange.

In a preferred embodiment, the partial flow suction channels run in supply bores provided in the extrusion die, in particular in a spiral distributor. This has the advantage that no additional manufacturing steps are necessary and the present structure of the extrusion die can be utilized.

Advantageously, the device according to the invention comprises a suction unit for the generation of an air flow through the interior of the profile. The suction unit can be, for example, a side channel compressor which can generate substantially higher differential pressures for example compared with a fan.

In a preferred embodiment, the partial flow suction channels open out in a collecting suction channel which is connected with the suction unit. The shorter the partial flows are, the less is the pressure loss in the suction system. Therefore, it is advantageous to bring the partial flow suction channels together again without delay.

In a further preferred embodiment, the device according to the invention has a regulating device for regulating the output of the suction unit as a function of the temperature of the air flow generated by it. Provision is advantageously made here that a temperature sensor is arranged within the air flow and is connected with the regulating device. In this way it is possible to regulate the extent of the air cooling, which leads to an additional improvement in quality of the plastic profile, because the cooling process can be adapted to changing boundary conditions and therefore a constant residual stress profile can be achieved. Boundary conditions are, for example, the mass throughput, the nominal tube wall thickness, the tube diameter or the ambient air temperature.

By the invention, therefore, in addition to a simpler design and advantages relating to manufacture as a result of this, improved process properties, such as e.g. a smaller loss of pressure and shorter flushing times, with improved tube quality are achieved. The device according to the invention gives rise here not only to lower manufacturing costs and less effort for assembly, but also has a smaller space requirement.

BRIEF DESCRIPTION OF THE DRAWING

The invention is explained in further detail below with the aid of an example embodiment and with reference to the drawings.

DETAILED DESCRIPTION OF PREFERRED EMBODIMENTS

Figures 1A, 1B:
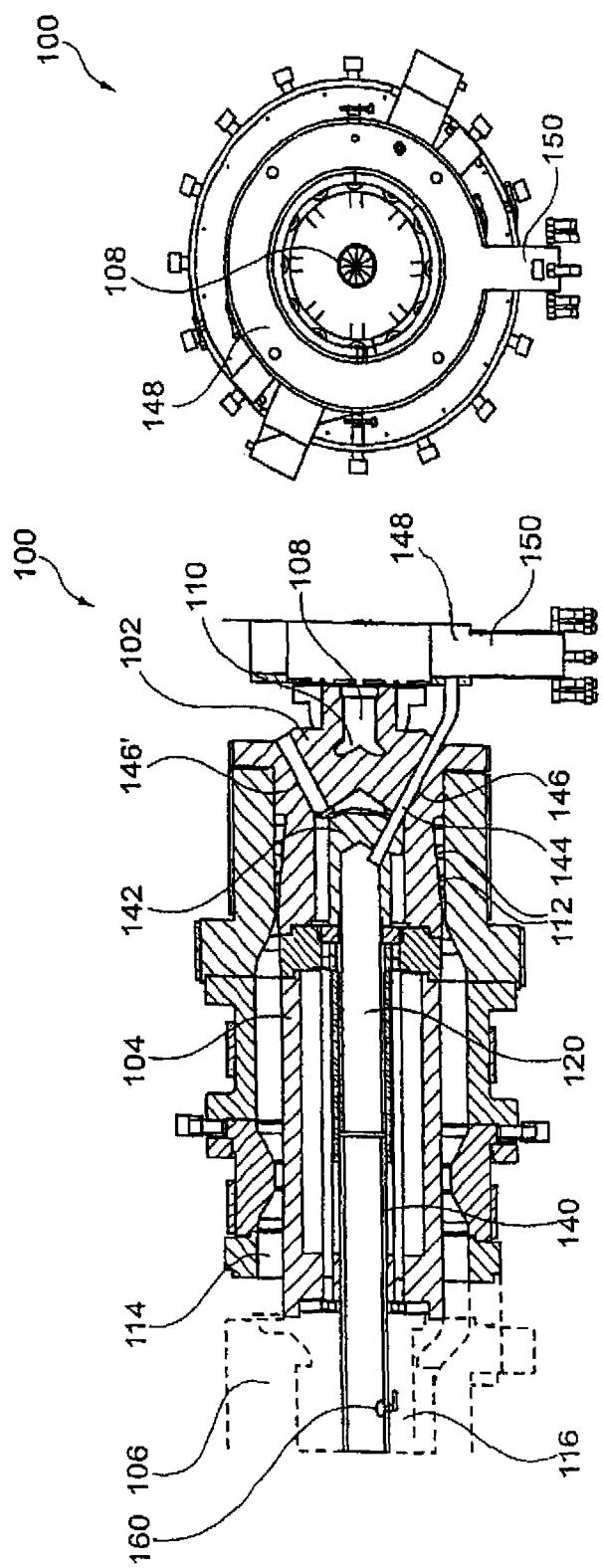
FIGS. 1*a, b, c* show three views of a device according to the invention in accordance with an example embodiment.

FIG. 1*a* shows in a simplified side view an extrusion die 100, here a spiral distributor tube head with, in succession in the extrusion direction, a spiral distributor 102, a mandrel- and nozzle connection piece 104 and a nozzle set 106. The spiral distributor 102 comprises an on-flow opening 108, melt pre-distribution channels 110 arranged substantially in a star shape, and spiral distributor channels 112. A melt channel 114, which encompasses the extrusion axle 120 radially, is connected to the spiral distributor channels 112 in the mandrel- and nozzle connection piece 104 and in the nozzle set 106. The nozzle set 106 is advantageously exchangeable, in order to be able to realize various tube dimensions.

Not illustrated in the figure is an extruder with an extruder flange, which is connected with the on-flow opening 108 and feeds the plastic melt into the latter. The extruder flange, and also the on-flow opening 108, are arranged centrally here on the extrusion axle 120; this therefore concerns a central feeding. The plastic melt is fed from the extruder flange, which is not illustrated, into the on-flow opening 108, from there into the melt pre-distribution channels 110 and further directed into the spiral distributor channels 112. In the spiral distributor channels 112 the melt is brought into a homogeneous, hollow form and is directed into the melt channel 114, from which it then emerges through the nozzle set 106 as a tube.

The extrusion die 100 comprises in addition a suction device for the suctioning of air through the profile- or respectively tube interior contrary to the direction of extrusion. The suction device comprises, in the suctioning direction, a central suction tube 140, a distributor piece 142, partial flow suction channels 144, a collecting suction channel 148, in which the partial flow suction channels 144 open out and which is connected via a suction connector 150 with a suction unit, for example a side channel compressor, which is not illustrated in the figures.

The central suction tube 140 extends within the melt channel 114 approximately from the die mandrel 116 of the nozzle set 106 into the spiral distributor 102 almost up to the supply bores 146, 146'. The length of the central suction tube can vary—it does not have to terminate flush with the extrusion die, but rather can also be longer or shorter. However, it is preferred that the central suction tube is somewhat longer than the die mandrel. A telescopic central suction tube offers advantages in addition, because it is able to be easily adapted to the dimension of various nozzle sets. The central suction tube does not have to be round; however, a round cross-section lends itself in the case of a tube head. It is then also advantageous if the central suction tube is arranged on the extrusion axle, so that the radial distance from the melt channel is uniform and a uniform interior cooling of the tube takes place. The central suction tube 140 is arranged within a cavity in the extrusion die 100. A thermal separation between the central suction tube 140 and the surrounding components of the extrusion die 100 does not have to exist obligatorily, but is provided in this example embodiment.

In this example embodiment, the partial flow suction channels 144 extend in the supply bores 146 of the spiral distributor and lead out from the interior of the extrusion die 100, here in particular of the spiral distributor 102. However, partial flow suction channels do not have to run in all supply bores. FIG. 1*a* shows, for example, a supply bore 146, in which a partial flow suction channel 144 runs from the central suction tube 140 up to the collecting suction channel 148, and a supply bore 146' without a partial flow suction channel. The supply bores 146, 146' run in a star shape in the opposite direction between the melt pre-distribution channels 110. In other words, the partial flow suction channels 144 or respectively the supply bores 146 run contrary to direction of extrusion radially away from the extrusion axle, whereas the melt pre-distribution channels 110 lead contrary to the direction of extrusion radially towards the extrusion axle.

The partial flow suction channels do not compulsorily have to run in the supply bores; in an alternative embodiment, the partial flow suction channels can be arranged separately. When the partial flow suction channels are not linked to the course of the supply lines, but rather are applied specifically, the angle of the partial flow suction channels to the extrusion axle can be selected so that in combination with the length of the partial flows as small pressure losses as possible occur.

In a further alternative embodiment, a thermal separation can be provided between partial flow suction channels and supply bores, e.g. by tubes or pipes which are isolated (e.g. also by an air gap), arranged in the supply bores.

The distributor piece 142 produces the connection between a central suction tube 140 and partial flow suction channels 144. The distributor piece 142 and central suction tube 140 can also be configured integrally. In particular if the supply bores 146 themselves constitute the partial flow suction channels 144, the distributor piece 142 is given the function of an adapter.

In order to minimize the pressure losses, the partial flows should be as short as possible. Therefore, the distributor piece 142 should likewise be configured so that the partial flows are kept as short as possible. For the same reason, the partial flow suction channels 144 should also be kept short at the outlet side and be combined as far as possible immediately after emerging from the spiral distributor 102 in the collecting suction channel 148.

A regulating device is not shown in the figures for regulating the output of the suction unit, which is likewise not shown. In FIG. 1*a*, however, a temperature sensors 160 is sketched at the input of the central suction tube 140, which sensor establishes the actual value of the temperature of the air flow in the central suction tube 140 and communicates it to the regulating device, so that the regulating device can regulate the output of the suction unit as a function of the established temperature of the air flow. In the case of a side channel compressor as suction unit, for example its rotation speed is regulated and via this the air volume flow in the suction device. The desired value of the temperature of the air flow can be established for example as a function of tube diameter, throughput, nominal tube wall thickness. Desired values appropriate to the tube parameters can be deposited retrievably in a memory of the regulating device, so that the choice of a desired value can take place automatically. Through the regulation, e.g. fluctuations of the input air temperature or respectively ambient air temperature can be equalized. The temperature sensor can of course also be mounted at a different position within the suction device. A suitable position of the temperature sensor can be calculated for example by caloric averaging. It is likewise conceivable to provide several temperature sensors.

FIG. 1*b* shows a view of the extrusion die 100 in the direction of extrusion. Identical elements are provided with identical reference numbers.

Figure 1C:
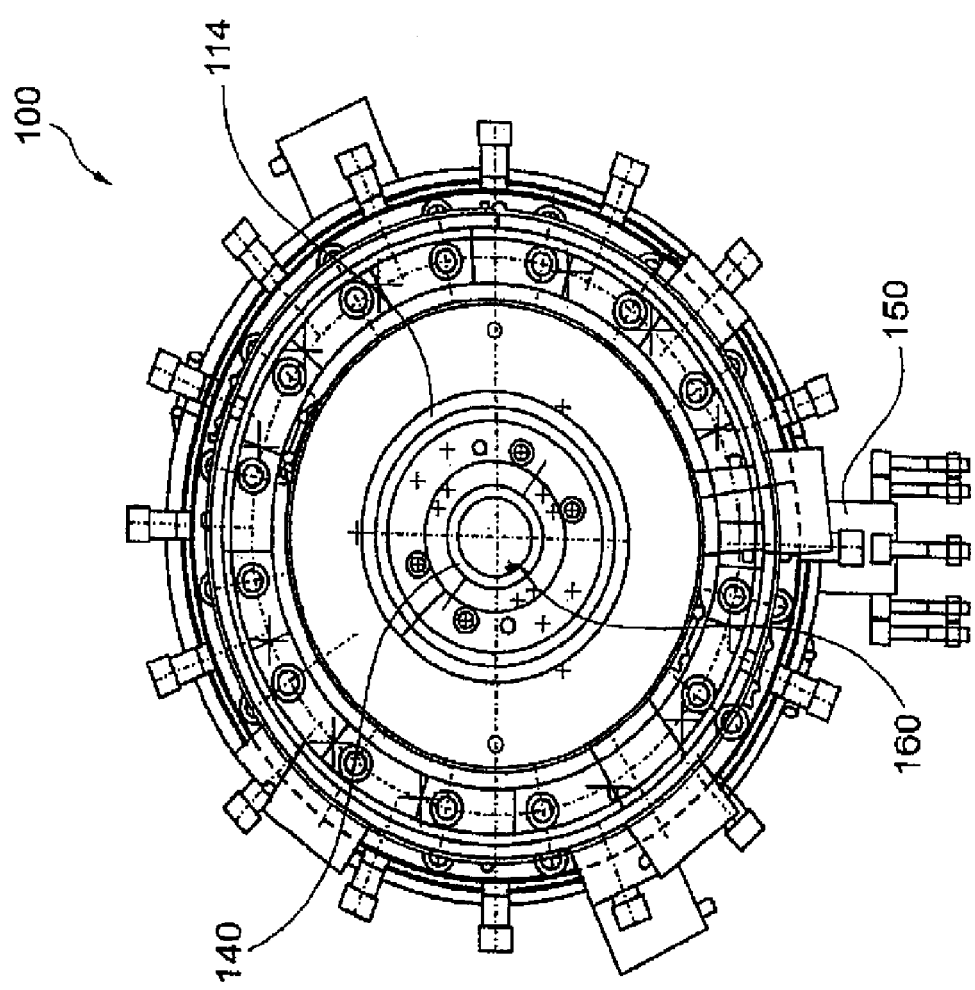

FIG. 1*c* shows a view of the extrusion die 100 in the suctioning direction. Identical elements are again provided with identical reference numbers. For example, the central suction tube 140 and the indicated temperature sensor 160 can be seen particularly readily.

Figure 2:
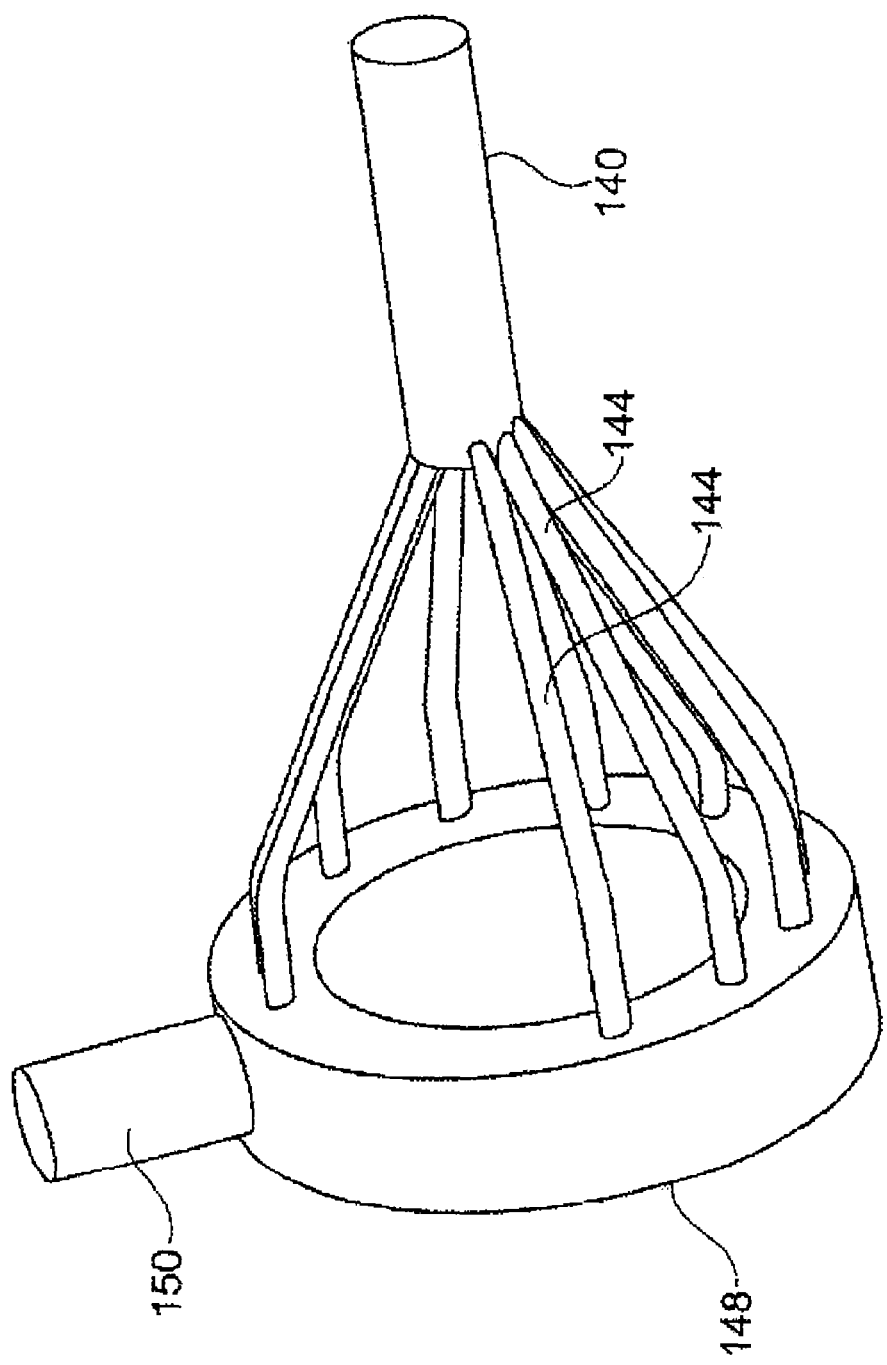
FIG. 2 shows a cut-out of a suction device according to the invention in accordance with an example embodiment.

FIG. 2 shows a simplified cut-out of a suction device according to the invention in three-dimensional view. Identical elements are again provided with identical reference numbers as in FIGS. 1*a, b, c*. The figure shows how the partial flow suction channels 144 run apart in a star shape. Whilst therefore the melt pre-distribution channels 110 direct an individual incoming melt strand on the extrusion axle 120 apart so that a hollow body can arise, the partial stream suction channels 144 guide the incoming air flow from the central suction tube 140 in the opposite direction apart so that the air is directed out from the interior of the extrusion die 100. In order to keep the pressure losses in the suctioning as small as possible, it is desirable to keep the number of partial flow suction channels likewise as small as possible, but great enough so that their accumulated cross-section can receive the incoming air flow from the central suction tube.

Therefore, a simpler design and improved process properties are achieved by the device and the method according to the invention, and in this way not only are production and assembly costs reduced, but also a greater energy efficiency and a better tube quality are made possible.

The invention claimed is:

1. A device for generating a hollow plastic profile, in particular a plastic tube, comprising:
    an extrusion die having an extrusion axle and a melt channel encompassing the extrusion axle, said extrusion die including a spiral distributor;
    an extruder feeding the melt channel with plastic melt in a direction centrally upon the extrusion axle for extruding the plastic melt in an extrusion direction and thereby forming a hollow profile; and
    a suction device for drawing air though an interior of the profile in a suctioning direction in opposition to the extrusion direction, said suction device having a central suction tube which is arranged within the melt channel, and partial flow suction channels which are connected in the suctioning direction to the central suction tube and sized to lead out from an interior of the extrusion die, said partial flow suction channels extending in supply bores provided in the spiral distributor of the extrusion die.

2. The device of claim 1, wherein the suction device comprises a suction unit for generating an air flow in the suctioning direction.

3. The device of claim 2, wherein the partial flow suction channels port into a collecting suction channel which is connected with the suction unit.

4. The device of claim 2, further comprising a regulating device regulating an output of the suction unit as a function of a temperature of the air flow.

5. The device of claim 4, further comprising at least one temperature sensor arranged within the air flow and connected with the regulating device.

6. A method for generating a hollow plastic profile, in particular a plastic tube, comprising:
    feeding plastic melt into an extrusion die in a direction centrally upon an extrusion axle of the extrusion die;
    distributing the plastic melt by a spiral distributor of the extrusion die into a melt channel of the extrusion die, which melt channel encompasses the extrusion axle, for forming a hollow profile in an extrusion direction; and
    drawing air in opposition to the direction of extrusion through an interior of the profile, by a central suction tube, which is arranged within the melt channel, and through partial flow suction channels which extend in supply bores provided in the spiral distributor and sized to lead out from an interior of the extrusion die.

* * * * *

UNITED STATES PATENT AND TRADEMARK OFFICE
CERTIFICATE OF CORRECTION

| | | |
|---|---|---|
| PATENT NO. | : 8,758,661 B2 | Page 1 of 1 |
| APPLICATION NO. | : 13/704927 | |
| DATED | : June 24, 2014 | |
| INVENTOR(S) | : Schneider | |

It is certified that error appears in the above-identified patent and that said Letters Patent is hereby corrected as shown below:

In the Claims

In column 5, line 13: after "air" should be -through- instead of incorrectly "though"

Signed and Sealed this
Ninth Day of September, 2014

Michelle K. Lee
*Deputy Director of the United States Patent and Trademark Office*